Inventor
W. BEZDEL

By Robert Harding Jr.
Attorney

| DIGIT | Col 1 | Col 2 | Col 3 | Col 4 | Col 5 |
|---|---|---|---|---|---|
| 0 | X | | | | X |
| 1 | X | X | | | |
| 2 | | X | X | | |
| 3 | | | X | X | |
| 4 | | | | X | X |
| 5 | | X | | | X |
| 6 | X | | X | | |
| 7 | | X | | X | |
| 8 | | | X | | X |
| 9 | X | | | X | |
| 0 | X | | | | X |

Inventor
W. BEZDEL
By [signature]
Attorney

Inventor
W. BEZDEL
By Robert Harding Jr.
Attorney

May 21, 1963 W. BEZDEL 3,090,836

DATA-STORAGE AND DATA-PROCESSING DEVICES

Filed Oct. 29, 1958 9 Sheets-Sheet 4

Inventor

W. BEZDEL

By Robert Harding

Attorney

DATA-STORAGE AND DATA-PROCESSING DEVICES

Filed Oct. 29, 1958 9 Sheets-Sheet 5

Inventor
W. BEZDEL
By [signature]
Attorney

May 21, 1963 W. BEZDEL 3,090,836

DATA-STORAGE AND DATA-PROCESSING DEVICES

Filed Oct. 29, 1958 9 Sheets-Sheet 6

Inventor

W. BEZDEL

By Robert Harding Jr.
Attorney

*Inventor*
W. BEZDEL

*By* Robert Harding Jr.
*Attorney*

DATA-STORAGE AND DATA-PROCESSING DEVICES

Filed Oct. 29, 1958 9 Sheets-Sheet 8

Inventor
W. BEZDEL

By Robert T. Harding Jr.
Attorney

FIG. 10.

| Cycle | All lines idle | | Line 10 calling | |
| --- | --- | --- | --- | --- |
| | Summary | Detail | Summary | Detail |
| Datum | L - | 9 --- | L - | 9 --- |
| 1 Read<br>Record | L -<br>M a | 9 ---<br>10 XX- | L -<br>M a | 9 ---<br>10 XX- |
| | M a | 10 XX- | M a | 10 XX- |
| 2 Read<br>Record | M a<br>M - | 10 XX-<br>10 --- | M a<br>M b - | 10 XX-<br>10 X-- |
| | M - | 10 --- | M b | 10 X-- |
| 3 Read<br>Record | M -<br>N a | 10 ---<br>11 XX- | M b<br>M c | 10 X--<br>10 -X- |
| | N a | 11 XX- | M c | 10 -X- |
| 4 Read<br>Record | N a<br>N - | 11 XX-<br>11 --- | M c<br>M d | 10 -X-<br>10 XXX |
| | N - | 11 --- | M d | 10 XXX |
| 5 Read<br>Record | N -<br>O a | 11 ---<br>12 XX- | M d<br>M d | 10 XXX<br>10 XXX |
| | O a | 12 XX- | M d | 10 XXX |

Inventor
W. BEZDEL

By [signature]
Attorney

United States Patent Office 3,090,836

Patented May 21, 1963

3,090,836

DATA-STORAGE AND DATA-PROCESSING DEVICES

Wincenty Bezdel, London, England, assignor to International Standard Electric Corporation, New York, N.Y., a corporation of Delaware Filed Oct. 29, 1958, Ser. No. 770,334
Claims priority, application Great Britain Nov. 8, 1957
7 Claims. (Cl. 179—15)

This invention relates to data processing and data storage equipment and is of application in telecommunication exchanges.

An object of the invention is to allocate one of a series of time-positions to an information source in a distinctive condition. In a telecommunication exchange such an object is achieved by allocating a time-position of a time-division multiplex system to a line in the calling condition.

According to the invention, electrical operational control equipment is provided comprising a matrix of bi-stable storage cells provided with row conductors, column conductors, a row scanning device for repetitively scanning said row conductors and applying operating potential conditions thereto, individual column circuits for simultaneously applying operating potential conditions to said column conductors in synchronism with said row scanning circuit, column stores for temporarily storing the information read from a row of matrix cells, a control circuit associated with said storage matrix and said column stores, a number of user channels, wherein one matrix row is allocated to each user channel and is arranged to store a number having a predetermined maximum value, wherein said control circuit is arranged to precess a number stored in any one of said matrix rows (add "1" to the number of each scanning cycle) repetitively between two predetermined values (e.g. 0–99, 0–99 . . .) during periodic scans of the matrix rows throughout any period in which the associated user channel is in a first condition, and to staticise a number (cause the number to remain) in said row throughout any period in which the associated user channel is in a second condition, the number-changing process and the value of the staticised number each having an operational signfiicance.

According to the invention, electrical operational control equipment is also provided for allocating any one of a number of user channels to any one of a number of intelligence circuits which assumes an active state, which includes a matrix of bi-stable storage cells arranged in rows and columns, each row corresponding to a user channel and each row being capable of storing a number identifying an intelligence circuit; means for reading from and recording in said matrix a row at a time; testing means operable to test an intelligence circuit identified by a number read from a row and to deliver an output signal if the tested circuit is in the active state; and control means operable in the absence of an output signal to precess the number stored in a row, and operable on delivery of an output signal to cause the number read from a row to be re-recorded therein; whereby any user channel is made available to any intelligence circuit and may be allocated to an intelligence circuit in the active state.

According to the invention, there is further provided apparatus for allocating a time-position of a time-division multiplex transmission system to a calling line which includes a storage unit for each time-position of the multiplex; reading and recording means for repeatedly reading information from and recording information in the storage units one at a time in turn; testing means operable on the reading of information from a storage unit to test a line identified by the information in order to ascertain whether the line is in the calling condition and to deliver a distinctive signal when the tested line is in the calling condition; and control equipment operable in the absence of such a signal to cause the subsequent recording in the storage unit of information identifying a line other than the line tested, and alternatively operable when said signal is delivered to re-record in the storage unit the information read therefrom, so that the same line is tested on a subsequent reading of the storage unit; whereby each time-position of the multiplex is made available to all the lines by successive readings of the corresponding storage unit, is allocated to any one of the lines which assumes the calling condition, and is retained for use thereby so long as the line remains in the calling condition.

The invention will now be described with reference to the accompanying drawings in which:

FIG. 1 is a schematic diagram of apparatus according to the invention applied to a telecommunication exchange, FIG. 2 shows a code used for storing digits in a store forming part of the apparatus of FIG. 1, FIG. 3 shows wave-forms of pulses used in working the apparatus, FIGS. 4, 5, 6 together show column circuits of the store and some control gates, FIGS. 7, 8 together show part of a comparator and further control gates, FIG. 9 shows the arrangement of the access selector, access gates and testing gates, FIG. 10 shows information read from and recorded in a row of the store at different times.

*Summary of Operation*

A store has a row of storage cells for each time-position of a time-division multiplex system. Each row has code cells for storing a subscriber's number, and control cells. The rows are read one at a time in turn in a constantly recurring reading cycle which is conveniently synchronised with the time-division cycle. The functions performed on reading a row are dependent on the information read from the row, so that rows read during any one reading cycle may be used for similar or different purposes according to their content. After a number has been read from a row, the line bearing that number is tested. If the line is idle, that number increased by one is recorded in the row for reading in the next reading cycle, so that the time-position represented by the row may be offered to the other lines in turn during successive reading cycles. When the line tested is in the calling condition, the same number is recorded in the row as was read from it, so that the time-position represented by the row is again made available to the line during the next reading cycle. When a number read from a row is re-recorded therein, distinctive entry is made in the control cells of the row as an indication that the time-position corresponding to the row is in use.

Apparatus which gives the facilities outlined in the previous paragraph may take a number of forms. For instance, the store may be a co-ordinate array of toroids, a perforated ferrite plate, or it may be composed of a delay line or stepping pattern register for each column, in which case the rows are formed by cells occupying corresponding positions in the delay lines or registers. The means for reading the store, although shown conventionally in FIG. 1 as a uni-selector will most conveniently be a suitable form of pulse generator and distributor. For detecting the condition of the lines a coincidence gate may be used giving an output for either the calling or the idle condition. The gate is connected to a testing wire similar to the lead provided for testing and signalling purposes and described in the application of Cattermole et al., Serial No. 663,704, filed June 5, 1957, in connection with FIG. 17. Alternatively a bi-stable register could be used to give a distinctive output for each line condition. If the number read from a row is the number of a line to which a time-position has already been allocated, means must be provided to prevent the allocation of a second time-position to the line. Such means might include a bi-stable register for each line operable to indicate the allocation of a time-position to the line with which the register is associated. Alternatively a number read from a row may be compared, by means of suitable equipment, with the numbers recorded in rows whose time-positions are allocated. If the reading cycle is not synchronised with the time-division multiplex cycle, arrangements must be made for the speech paths corresponding to the private wires to be switched in synchronism with the multiplex. It will of course be appreciated that the private wires may be associated either with subscriber's lines or with junction lines carrying traffic incoming from another exchange.

In the apparatus to be described below in detail, the store is of the type embodying a perforated ferrite plate. Each column is provided with a column circuit operable in response to an output delivered when a cell in the column is read. The apparatus is used in connection with a hundred subscriber's lines, and the reading cycle is synchronised with the multiplex cycle. A testing gate is provided for each line and delivers an output pulse P when the line with which it is associated is tested and is in the calling condition. To prevent allocating two time-positions to a calling line, a comparator is provided as part of the common equipment.

It will be convenient to outline the working of the apparatus further described below by considering any one row of the store and its contents during a succession of reading cycles. Reference may be made to the columns headed "Summary" in the table shown in FIG. 10. Suppose the number L representing a subscriber's line is stored in the row, and that there is no entry in the control cells of the row. This number will be read out during the next reading cycle which for convenience will be called the first reading cycle. One is then added to the number L, and the new number, say M, is recorded in the row together with an entry, which may be designated *a*, in the control cells of the row. When the row is read during the second reading cycle, the number M and the entry *a* are read out. Corresponding access gates are thereby opened, and a cell individual to the line M in a store, or access selector, is operated and a testing pulse is delivered to the testing gate associated with the line M. If the line is idle, no pulse P is delivered, and the number M is re-recorded in the row Y no entry being made in the control cells. When the row is read during the third reading cycle, the number M is read out, one is added thereto and the new number, say N, together with the entry *a*, is recorded in the row. This process is continued, and if the calling condition is not encountered, the time-position represented by the row is offered to all the lines in turn during alternate cycles of a succession of reading cycles.

If, however, the line M is engaged when tested during the second cycle, a pulse P is delivered which operates control gates and causes the number M to be re-recorded in the row together with an entry *b* in the control cells of the row. The entry *b* indicates that the row is awaiting a comparator so that the number M stored in the row can be compared with the numbers in the rows whose time-positions are allocated, with the object of avoiding the allocation of two time-positions to one line. During the third cycle, the number M and the entry *b* are read out. If the comparator is in use, the number and the entry are re-recorded. If the comparator is free, the number M is recorded therein, and the number M and an entry *c* are recorded in the row. During the remainder of the third cycle and the initial part of the fourth cycle, the contents of the comparator are compared with the numbers read out from the other rows of the store. Comparison has been completed by the time the row is read during the fourth cycle and the number M and the entry *c* are read out. If identity has been found, the comparator is released, the number M is re-recorded in the row and no entry is made in the control cells of the row. Thereafter the time-position represented by the row is offered to the other lines are already described. If identity has not been found, the comparator is released, the number M is re-recorded in the row, and an entry *d* is made in the control cells of the row. During the fifth cycle the number and the entry *d* are read and re-recorded, the process being repeated during each cycle throughout the duration of the call on line M.

Although generally convenient, it is not essential that the difference between the numbers L, M, N . . . should be one. Any number may be added to or subtracted from a number read from a row, provided that the numbers of all the lines can be recorded in each row. If this latter condition is not fulfilled it is not possible to allocate all the time-positions to each of the lines.

*Detailed Description*

Figure 1:
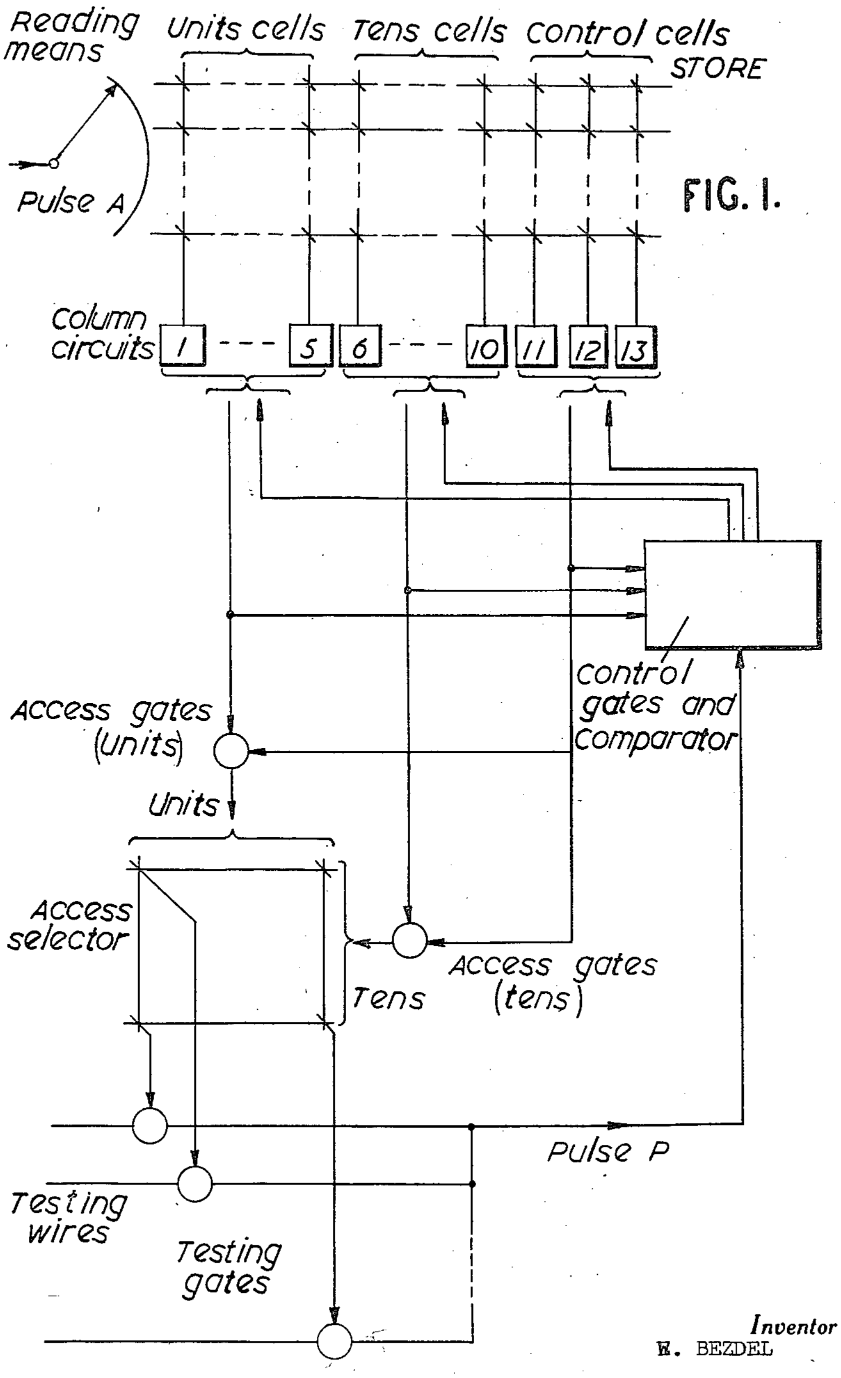

Referring to FIG. 1, the store which is of the type using a perforated ferrite plate, has a row of cells for each time-position of a time-division multiplex system used in the exchange. The store has thirteeen columns, although any other suitable number of columns could be used if desired. In any row, the first five cells are used to store the units digit, and the second five the tens digit of a number identifying one of a hundred subscribers' lines with which the apparatus is used. The digits are stored in accordance with a two-out-of-five code shown in FIG. 2, in which X represents a stored "1," "0" being stored in the other cells. In the case of the tens digit, the code is stored in the cells of columns 6–10. By appropriate alterations to the circuitry of the apparatus, other codes may be used if desired. The remaining columns 11–13, three in number in this instance, are used for control purposes. Each column has a column circuit represented by a square in FIG. 1. When a stored "1" is read from any cell in a column, the column circuit is operable to give a distinctive output. Each column circuit can also be used in recording in any cell of the column to which the column circuit is appropriate.

The store is read row by row in response to reading pulses applied to the rows in turn. Although shown diagrammatically in FIG. 1 as a uniselector, the reading means comprise a suitable pulse generator of known type and a suitable pulse distributor of known type. The reading pulses applied to the rows have the wave-form shown at A in FIG. 3, namely a square-topped reading pulse of one polarity followed immediately by a pulse of opposite polarity and half the amplitude. The reading pulse is used for reading out the contents of a row and operating the column circuits accordingly, and the following half-strength pulse is used for co-ordinate writing or recording in the row.

An access selector, which may conveniently be a store of the type using a perforated ferrite plate, has a storage cell for each one of the hundred subscribers' lines. The cells are arranged in ten rows and ten columns, the rows representing the tens digits and the columns the units digits. A system of access gates, represented only diagrammatically in FIG. 1, is interposed between the column circuits and the access selector, so that outputs from column circuits 1–5 supply pulses to the columns of the access selector, and column circuits 6–10 supply pulses to the rows of the access selector for co-ordinate selection of individual cells in the access selector. Connections between the column circuits and the access gates are made in accordance with the code of FIG. 2.

In addition to a conductor for each row and column, the access selector is provided with a biassing conductor threading all the cells in the selector. Current flows continuously in this biassing conductor and biasses all the cells to the "0" condition. A single row or column pulse is insufficient to overcome this bias, but when both a row and a column pulse pass simultaneously through a cell, as is the case in co-ordinate selection, the cell is triggered to the "1" condition. When either or both of the pulses ceases the cell reverts to the "0" condition. When a number is read from a row in the store, the corresponding column circuits are operated. By means of the access gates, the cell in the access selector identified by the number is operated and delivers a testing pulse to a testing gate in a testing wire of the subscriber's line bearing the number. A suitable circuit for a testing wire is described in application Serial No. 663,704, mentioned above.

Figures 2, 3:
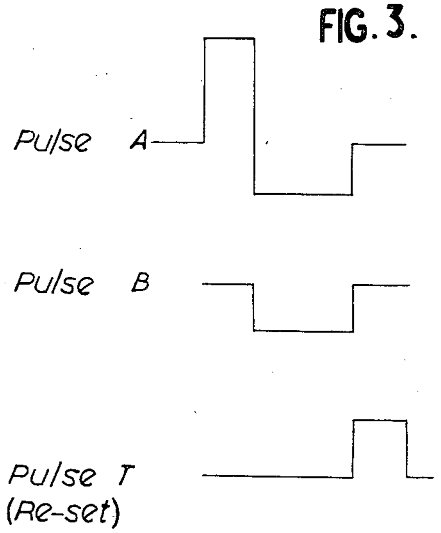

If the tested line is idle, the testing gate remains closed. On the other hand if the tested line is in the calling condition, a pulse P is delivered by the testing gate. The pulse P in conjunction with the column outputs determines the operation of control gates, as a result of which half-write pulses, having the wave-form shown at B in FIG. 3, are applied to selected columns of the store in order to write or record in selected cells of the row in co-operation with the second or half-write portion of the pulse A being applied to the row. The control gates are also operable to bring the comparator into operation if required.

When writing has taken place in a row, a re-set pulse having the wave-form shown at T in FIG. 3 is applied to the column circuits, to re-set them in preparation for the reading of the next row of the store in response to the next pulse A of the reading cycle.

Figure 4:
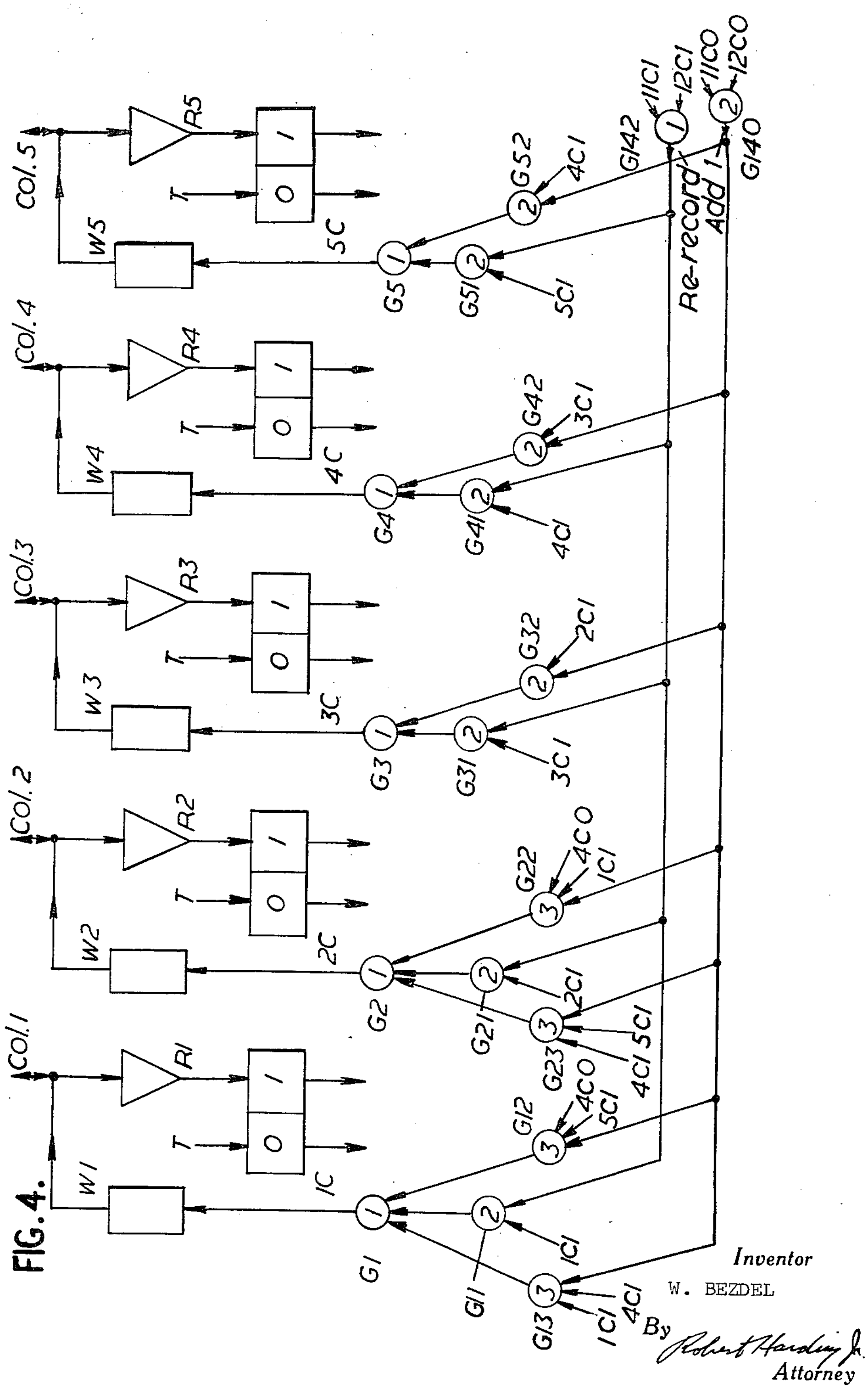
Figure 5:
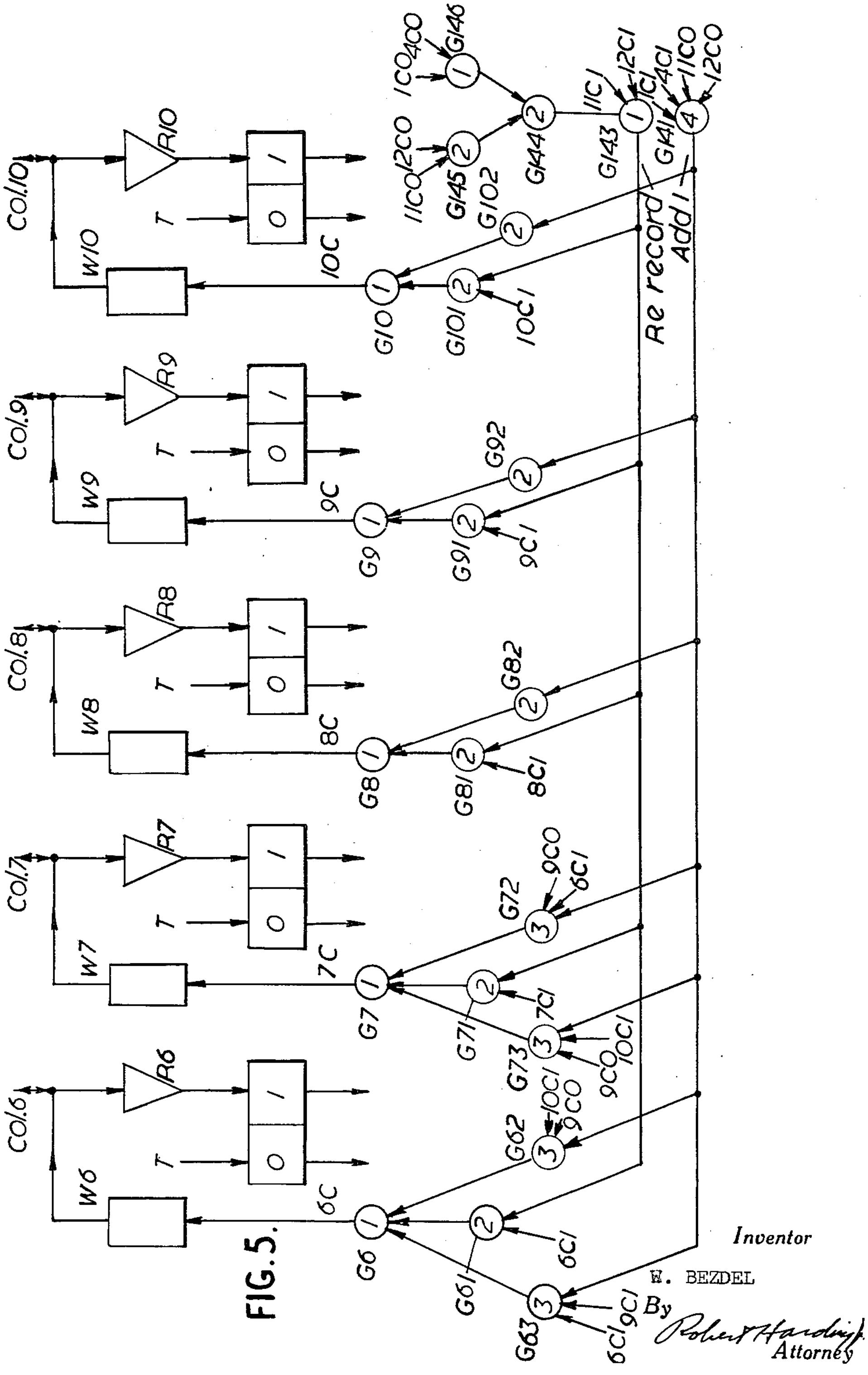
Figure 6:
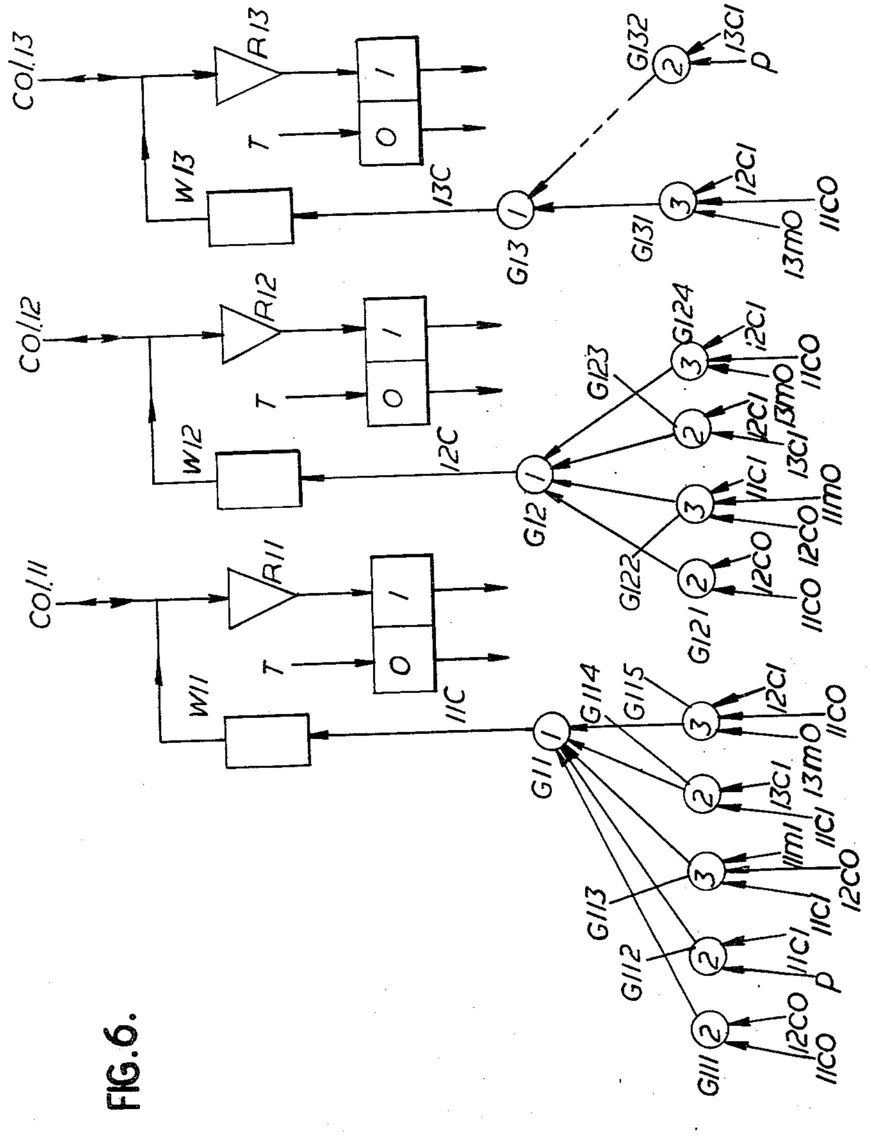
Figure 7:
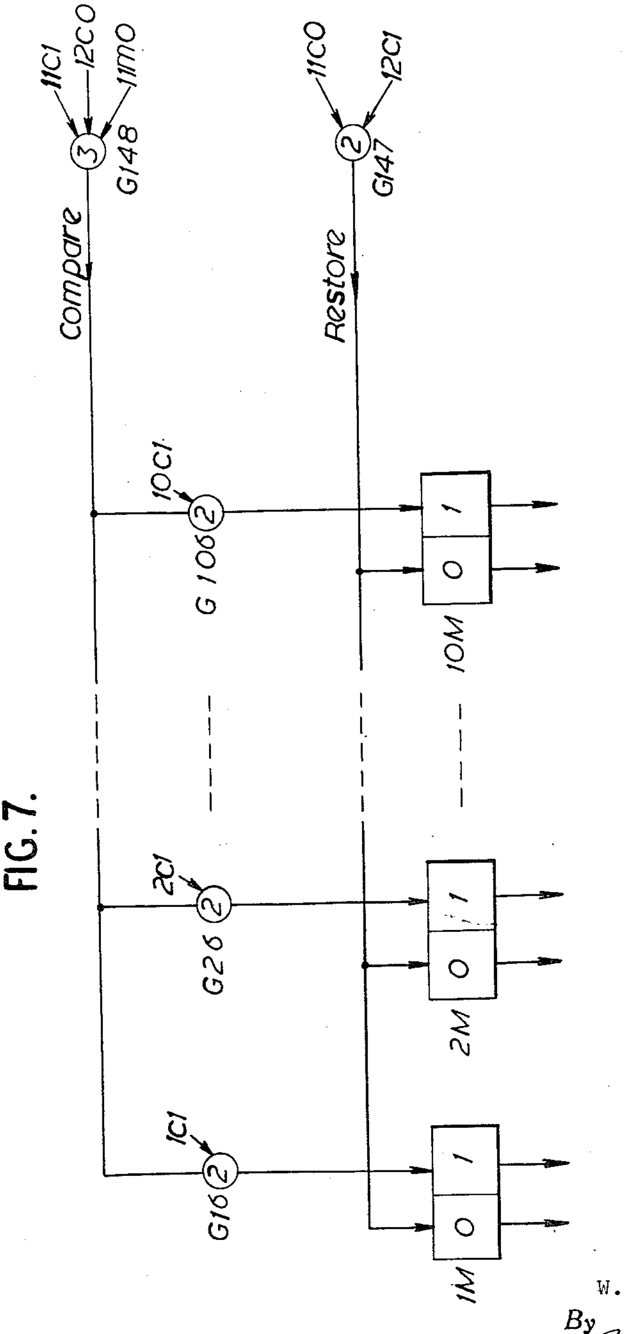
Figure 8:
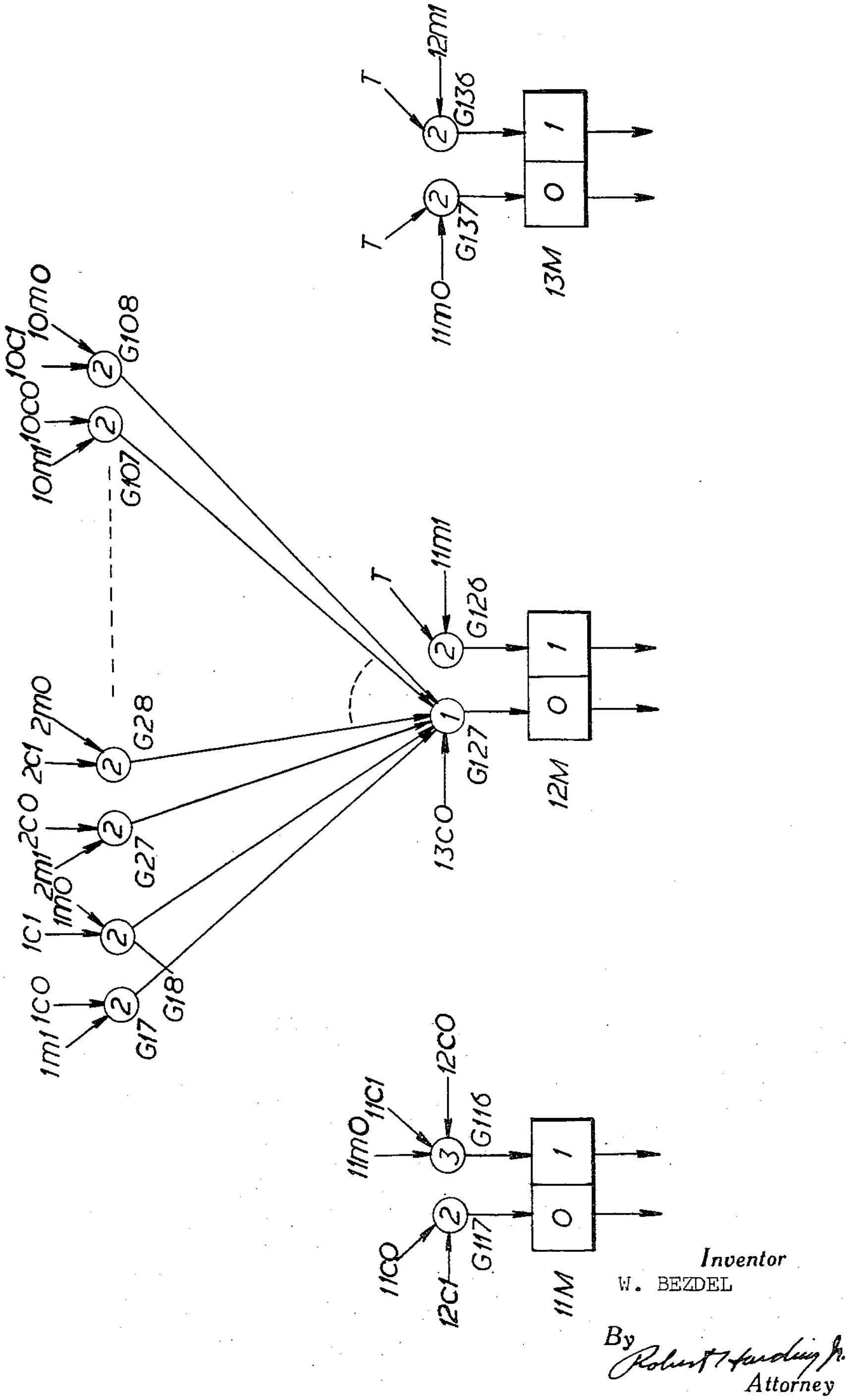

The column circuits and some of the control gates are shown more fully in FIGS. 4, 5, 6, and the comparator together with the remainder of the control gates in FIGS. 7, 8. The access selector, access gates and testing gates are shown in FIG. 9.

Referring to FIGS. 4, 5, 6, a column circuit includes an amplifier R for amplifying the output delivered by a cell in the column when a stored "1" is read therefrom. The amplified output pulse is passed to a bi-stable register C to operate the register from its normal condition "0" to its operated condition "1." In addition to an amplifier and a register, a column circuit includes a circuit *w* by means of which a half-write pulse having the wave-form shown at B in FIG. 3 may be applied to the cells in the column. Each amplifier R and writing circuit *w* is identified by a suffix indicating the number of the column with which it is associated. Control gates are represented by a circle containing a number indicating the number of input signals necessary to cause the gate to open i.e. to deliver an output signal. The gates bear the reference letter G: for those associated with a particular column, the letter G is followed by the number of the appropriate column, and this number is in turn followed by an identifying digit; other gates bear the reference letter G and are numbered from 140 upwards.

Referring to FIGS. 7, 8, the comparator consists of a bi-stable register M corresponding to each column circuit. In FIGS. 7, 8, control gates are shown in the same manner as in FIGS. 4, 5, 6.

Figure 9:
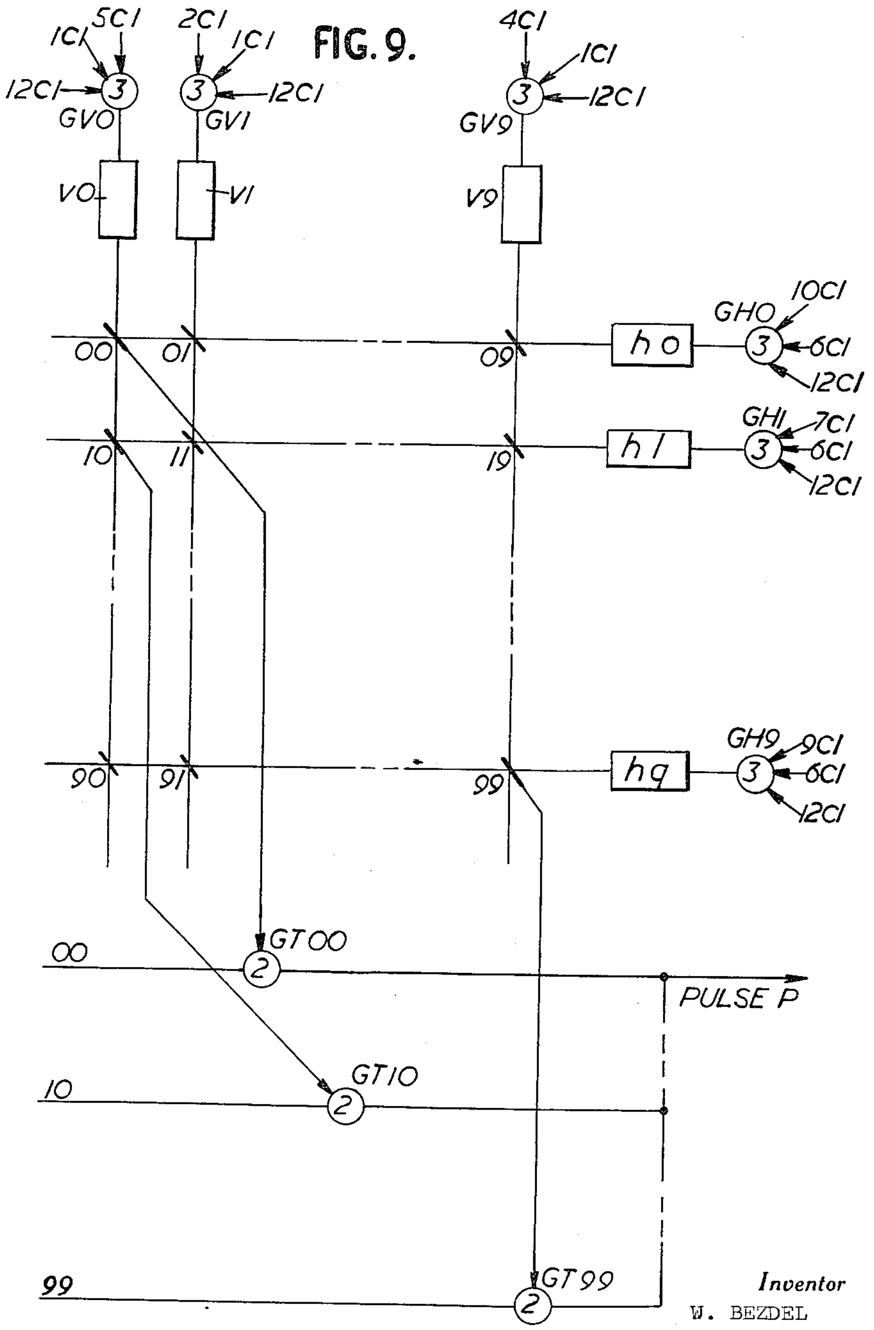

In FIGS. 4–8, as well as in FIG. 9, an output from a bi-stable register bears the reference of the register, having the letter *c* or *m* in small type together with the digit "0" or "1" according to whether the output is delivered when the register is in the normal or the operated condition.

Referring to FIG. 9, the access selector consists of a store of the type employing a perforated ferrite plate which has one cell for each of the hundred subscribers lines with which the apparatus is associated. The cells are arranged in ten rows and ten columns for co-ordinate selection. Each row has a circuit *h*, and each column a circuit *v*, by means of which half-strength triggering pulses may be applied to selected row and column conductors, in response to the opening of selected access gates designated respectively GH0–GH9 and GV0–GV9. Suitable means (not shown) are provided for re-setting cells which have responded to triggering pulses. The means may operate in any convenient way e.g. individually after the triggering of each cell, in groups, say, of a row of cells at a time, or all the cells may be re-set together at the end of each reading cycle. Circuits capable of performing such re-setting are well known in the art. From each cell an output lead is taken to a testing gate GT in the private wire of the appropriate subscriber's line.

*Details of Operation*

In describing the detailed operation of the apparatus, the sequence of events set out in the later part of the summary will be followed, and references to the various reading cycles should be construed accordingly. The row of the store which is being considered will be referred to as the given row. The table shown in FIG. 10 shows the information read from and recorded in the given row during successive reading cycles, firstly when all the tested lines are idle, and secondly when one of the lines is in the calling condition and the comparator is available when required. In both cases the information is shown twice, once by means of the symbols used in the Summary of Operation, and again by means of the subscribers' numbers and the condition of the control cells used in the example described in the Details of Operation. With reference to the latter, an entry in the control cells in the given row is indicated by a combination of three dashes or "X's" in the 11th, 12th, 13th cells of the given row.

Suppose that the number L stored in the given row is 9. The digit "9" is stored in the "units" cells of the row, and the digit "0" in the "tens" cells of the row, both in accordance with the code given in FIG. 2. Suppose also that the control cells of the row are empty. When a pulse having the wave-form shown at A in FIG. 3 is applied to the given row during the first reading cycle, the contents of the row are read out in response to the first or reading portion of the pulse. By reference to FIG. 2, it will be seen that the reading causes the operation of column circuits 1C, 4C, 6C, 10C, the other column circuits remaining unoperated. With column circuits 11C and 12C (FIG. 6) both in the normal or "0" condition, gates G140 (FIG. 4) G111, G121 (FIG. 6) are opened, as is also gate G141 (FIG. 5) to enable "one" to be carried to the "tens" columns. On the opening of gate G140, gates G13, G1 and G52, G5 are opened; on the opening of gate G141, gates G62, G6 and G73, G7; on the opening of gate G111, gate G11 is opened; and on the opening of gate G121, gate G12 is opened. With gates G1, G5, G6, G7, G11, G12 opened, the writing circuits *w*1, *w*5, *w*6, *w*7, *w*11, *w*12 are operated, delivering a pulse of the wave-form shown at B in FIG. 3 to the cells in the respective columns. In the given row, these pulses co-operate with the second portion of the pulse A being applied thereto and cause the operation of cells 1C, 5C, 6C, 7C, 11C, 12C. Thus when a pulse A was applied to the given row during the first reading cycle, "09" was read from the row, and "10" together with an entry *a* were written in the row, the entry *a* consisting of a "one" in each of columns 11, 12. A re-set pulse T is then applied to the column circuits, whereby they are all restored to their normal "0" condition in readiness for the reading of the next row of the store. When all the remaining rows of the store have been read, the first reading cycle is complete.

When the given row is read during the second reading cycle, the number "10" and the entry *a* are read out, operating column circuits 1C, 5C, 6C, 7C, 11C, 12C. With either of column circuits 11C, 12C operated both gates G142, G143 are opened, which, with column circuits 1, 5, 6, 7 operated, causes gates G11, G51, G61, G71 to be opened. Gates G1, G5, G6, G7 then open to operate circuits *w*1, *w*5, *w*6, *w*7. That is to say, the number read from the given row is re-recorded therein.

With column circuits 1C, 5C, 12C operated, access gate GV0 is opened and circuit $v0$ of the access selector is operated: with column circuits 6C, 7C, 12C operated, access gate GH1 is opened and circuit $h1$ of the access selector is operated. Cell 10 of the access selector is thereby triggered, delivering a testing pulse to testing gate GT10. If the line 10 is idle, testing gate GT10 fails to open and no pulse P is delivered.

In this case none of the circuits $w11$, $w12$, $w13$ is operated, so that nothing is recorded in the control cells of the given row.

When the given row is read during the third reading cycle, the number "10" is read out, and since there is no entry in the control cells, column circuits 1C, 5C, 6C, 7C are operated. With column circuits 11C, 12C in the normal condition, gate G140 is opened followed by gates G12, G1 and G22, G2. Circuits $w1$, $w2$ are operated, whereby "1" in place of "0" is recorded in the "units" cells of the given row. With column circuits 11C, 12C in the normal condition, also, gate G145 is opened, and since "9" was not read out from the "units" cells of the given row, gate G146 is opened. Thereafter gates G144, G143, G61, G6 are opened, as are gates G71 and G7, and circuits $w6$ and $w7$ are operated and the digit "1" is re-recorded in the "tens" cells of the given row. In the manner explained in connection with the first cycle, circuits $w11$, $w12$ are operated, recording the entry $a$ in the control cells of the given row.

During the fourth reading cycle the number "11" and the entry $a$ are read from the given row, as a result of which the line 11 is tested in the manner described with reference to the second cycle.

So long as the lines tested are in the idle condition, the addition of "1" to the number read from the given row and the testing of the line bearing the number read from the given row take place in alternate reading cycles.

Now suppose that the line 10 was in the calling condition when tested during the second reading cycle. In this event, test gate GT10 is opened, delivering a pulse P. With column circuit 11C operated, gates G112, G11 are opened and circuit $w11$ is operated. "One" is therefore recorded in cell 11 of the given row, which, with no entry in the other control cells of the row, constitutes entry $b$.

Before the multiplex time-position which corresponds to the given row, is allocated to the line 10 it is necessary to check that no other time-position has already been allocated to the line. As will be seen later, an entry $d$ which includes a "1" in cell 13, is made in a row when the time-position corresponding thereto has been allocated. To enable the check to be carried out, a comparator consisting of the bi-stable registers 1M–13M is provided, the register 11M being in the normal or "0" condition when the comparator is available, and in the operated or "1" condition when the comparator is in use. During the third reading cycle, the number "10" and the entry $b$ are read from the given row, causing the operation of column circuits 1, 5, 6, 7, 11. The opening of gates G142, G11, G1, G51, G5 and G143, G61, G6, G71, G7 causes the number "10" to be re-recorded in the given row. If the comparator is not available gate G113 is opened, followed by gate G11, and the entry $b$ is re-recorded in the given row. These conditions are regenerated each cycle until the comparator becomes free.

Suppose, however, that the comparator is free when the given row is read during the third reading cycle. The number "10" is re-recorded as just described. With column circuit 11 operated, column circuit 12 normal, and the comparator available i.e. register 11M in the normal condition, gate G122 is opened, followed by gate G12, so recording "1" in cell 12 of the given row. With the other control cells of the row empty, this constitutes entry $c$.

At this juncture it is necessary to consider the comparator in detail. When the comparator is available for use, the register 1M–11M and 13M are in the normal or "0" condition and register 12M is in the operated or "1" condition. When a number e.g. "41" is read from any row, the corresponding column circuits are operated, in this case column circuits 1C, 2C, 9C, 10C. Gates G18, G28, G98, G108 are opened, followed by gate G127. Since register 12M is already in the normal condition, the opening of gate G127 is ineffective.

Now reverting to the third reading cycle, column circuits 1C, 5C, 6C, 7C, 11C are operated when the given row is read. In addition to the re-recording of "10" and the recording of the entry $c$ in the given row described above, gates G18, G58, G68, G78, followed by gate G127, and gates G116, G148 are operated. The opening of gate G116 causes register 11M to be operated to condition "1" to indicate that the comparator is in use. With column circuits 1,5, 6, 7 operated, the opening of gate 148 is followed by the opening of gates G16, G56, G66, G76, so that the corresponding register 1M, 5M, 6M, 7M are operated to condition "1" and the number "10" is stored in the comparator.

As soon as the pulses A, B (FIG. 3) have been applied to the given row, a re-set pulse T restores all the column circuits of the store to normal. With register 11M operated, the pulse T opens gate G126 and operates register 12M to condition "1."

Continuing the third reading cycle, the next row of the store is now read. Suppose the number "41" is stored therein, the control cells being empty. Column circuits 1C, 2C, 9C, 10C are operated. With registers 1M, 5M, 6M, 7M operated, gates G28, G57, G67, G77, G98, G108, followed by gate G127 are opened. Register 12M is restored to normal and is then re-operated to condition "1" by pulse T and the opening of gate G126.

The other rows of the store are then read in turn during the remainder of the third and the first part of the fourth reading cycle.

Only if the number read from a row is the same as the number, "10" in this instance, stored in the comparator, do all the gates of the two series G17, G27 . . . G107 and G18, G28 . . . G108 fail to open. If, however, the control cells of the row from which the number "10" is read contain either no entry or one of the entries $a$, $b$ or $c$, gate G127 is opened, none the less, because column circuit 13 is in the normal condition. It will be shown later that when the time position corresponding to a row has been allocated to a line, "1" is recorded in cell 13 of the row concerned. Therefore the only circumstances in which gate G127 fails to open occur when the number read from a row is the same as the number stored in the comparator, and the operation of column circuit 13 indicates that the time-position corresponding to the row has been allocated to the line.

In the present example, gate G127 will fail to open if the number "10" is read from any row having "1" stored in cell 13. When this occurs, the pulse T immediately following the read-out opens gate G126 ineffectively. Gate G136 however is opened and register 13M is operated to condition "1." Hence, immediately before the given row is read in the fourth reading cycle, a comparison has been made between the number "10" stored in the comparator and the number stored for the time being in each of the other rows of the store, and the register 13M is in the "1" or "0" condition according to whether or not the number "10" has been read from a row other than the given row and the time-position corresponding to that row has been allocated to the line 10.

Before dismissing consideration of the comparison process it may be appropriate to refer to the row from which the number "10" was read and which had either no entry or one of the entries $a$, $b$ or $c$ in the control cells. The row, which will here be referred to as the second row, will store such information when the number "10" is re-corded therein after the same number has been recorded in the given row. The recording of the number "10" in the second row takes place as part of the process of testing and adding one to the number stored in the second row during alternate reading cycles, which has been fully explained above in relation to the given row. When the number "10" is read from the second row, the number thereafter recorded in the second row is, as already described, determined by the entry (if any) read from the row and the presence or absence of a pulse P: the recording is in no way affected by the operation of the comparator in comparing the number read from the second row with the number stored in the comparator and which was transferred thereto from the given row.

Resuming consideration of the given row, its contents immediately before reading in the fourth reading cycle are those recorded therein during the third reading cycle, namely the number "10" and the entry *c*. At this stage, the number "10" is recorded in the comparator, whose register 13M is in condition "1" or "0" according to whether or not a time-position has already been allocated to line 10.

If a time-position has already been allocated to line 10, register 13M of the comparator is in the operated or "1" condition. Registers 1M, 5M, 6M, 7M are in the "1" condition, storing the number "10"; register 11M is in the "1" condition, indicating that the comparator is in use; and register 12M has been operated to condition "1" by the last re-set pulse T. When the given row is read during the fourth reading cycle, columns 1, 5, 6, 7, 12 are operated to condition "1." Gates G117, G142, G143, G147 are thereby opened. The opening of gate G147 restores the operated registers 1M, 5M, 6M, 7M of the comparator to the normal or "0" condition; and the opening of gate G117 restores register 11M to normal, indicating that the comparator is available for further use. The opening of gates G142, G143 is followed by the opening of gates G11, G51, G61, G71 and G1, G5, G6, G7 and the re-recording of the number "10" in the given row. No entry however is made in the control cells of the given row, so that at the fifth reading cycle the process of adding one and testing during alternate reading cycles is resumed.

If, on the other hand, the check made by the comparator indicates that no time-position has been allocated to the line 10, the register 13M remains in the unoperated or "0" condition. Registers 1M, 5M, 6M, 7M, 11M, 12M are in the "1" condition. When the given row is read during the fourth reading cycle, column circuits 1C, 5C, 6C, 7C, 11C, 12C are operated to condition "1." Gates G117, G142, G143, G147 and G115, G124, G131 are thereby opened. The opening of gates G147, G117 restore and release the comparator, and the opening of gates G142, G143 re-records "10" in the given row, as explained in the previous paragraph. The opening of gates G115, G124, G131 is followed by the opening of gates G11, G12, G13 whereby "1" is recorded in each of the control cells of the given row, this constituting entry *d*.

When the given row is read during the fifth reading cycle, the number "10" and the entry *d* are read out, operating column circuits 1C, 5C, 6C, 7C, 11C, 12C, 13C to condition "1." Gates G114, G123, G142, G143, GV0, GH1 are thereby opened. The opening of gates G142, G143 is followed by the opening of gates G11, G51, G61, G71 and G1, G5, G6, G7 whereby the number "10" is re-recorded in the given row. The opening of gates G114, G123 is followed by the opening of gates G11, G12 and the re-recording of "1" in cells 11, 12 of the given row. The opening of gates GV0, GH1 is followed by the triggering of cell 10 of the access selector, and the application of a testing pulse to the testing gate GT10. Since the line 10 is in the calling condition, gate GT10 is opened and a pulse P is delivered. Gate G112 is opened, but since gate G11 has already been opened in response to the opening of gate G114, the opening of gate G112 is ineffective. Gate G132, which is shown by way of example only, is also opened, followed by gate G13, whereby "1" is recorded in cell 13 of the given row. That is to say, the number "10" and the entry *d* have been re-recorded in the given row.

These events recur during each subsequent cycle so long as "1" is stored in cell 13 of the given row. The re-recording of "1" in cell 13 of the given row may be controlled in any desired manner by the use of suitable circuitry which may be devised to suit particular requirements by any one skilled in the art. By way of a simple example, this re-recording is shown as controlled by gate G132, which in turn is controlled by the presence or absence of a pulse P as determined by the condition of the line 10. When the given row is read for the first time after the line 10 has been cleared, column circuits 1C, 5C, 6C, 7C, 11C, 12C, 13C are operated to condition "1." Gates G114, G123, G142, G143, GV0, GH1 are thereby opened. The opening of gates G142, G143 causes the number "10" to be re-recorded in the given row. The opening of gates G114, G123 causes "1" to be re-recorded in each of cells 11, 12 of the given row. In the absence of a pulse P, gate G132 fails to open, and no recording is made in cell 13. The contents of the given row consist of the number "10" and the entry *a*. When the given row is next read, the process of testing and adding one during alternate reading cycles will be resumed and continued until the calling condition is encountered.

When the number "10" and the entry *d* were first recorded in the given row i.e. during the fourth reading cycle, the check had been completed to ascertain that no multiplex time-position had been allocated to the line 10. After this check has been made, the number "10" and the entry *d* are re-recorded in the given row during each reading cycle until the line 10 is cleared. The time-position represented by the given row may therefore be allocated to the line 10 as soon as the entry *d* is recorded in the given row. If this is done, one and only one multiplex time-position will be allocated to the line 10; the same time-position will thereafter be re-allocated to the line 10 during successive reading cycles; and the time-position will be released for further use as soon as the line 10 is cleared.

A multiplex time-position represented by a row of the store may be allocated to a line in any convenient manner. For example, if the pulses A of the reading cycle are synchronised with the time-positions of a time-division multiplex system associated with a communication channel, the outputs delivered on the triggering of the cells of the access selector may be used not only to test the private wires of the lines, but also to connect the speech paths of the line to the communication channel. With such an arrangement, a switching device, e.g. a transistor, is provided in the speech path of each of the lines, and a lead is taken from the switching device of each line to the corresponding cell of the access selector. Then, when a cell is triggered, the switching device connected to the cell is operated, and the speech path of the line corresponding to the cell is connected to the communication channel for the duration of the triggering pulse. A suitable circuit for this arrangement is described in application, Serial No. 663,704, mentioned above.

While the principles of the invention have been described above in connection with specific embodiments, and particular modifications thereof, it is to be clearly understood that this description is made only by way of example and not as a limitation on the scope of the invention.

What we claim is:

1. Electrical operational control equipment comprising a matrix of bi-stable storage cells provided with row conductors, column conductors, a row scanning device for repetitively scanning said row conductors and applying operating potential conditions thereto, individual column circuits for simultaneously applying operating potential conditions to said column conductors in synchronism with said row scanning circuit, column stores for temporarily storing the information read from a row of matrix cells, a control circuit associated with said storage matrix and said column stores, a number of user channels capable of being in a first or a second condition, each matrix row being allocated to a different user channel and arranged to store a number having a predetermined maximum value, means in said control circuit for precessing a number stored in any one of said matrix rows repetitively between two predetermined values during periodic scans of the matrix rows throughout any period in which the associated user channel is in a first condition, and for staticising a number in said row throughout any period in which the associated user channel is in a second condition, the precessing process and the value of the staticised number each having an operational significance.

2. Electrical operational control equipment for allocating any one of a number of user channels to any one of a number of intelligence circuits which assumes an active state, comprising a matrix of bi-stable storage cells arranged in rows and columns, each row corresponding to a user channel and each row being capable of storing a number identifying an intelligence circuit; means for reading from and recording in successive rows of said matrix, a row at a time; testing means operable to test an intelligence circuit identified by a number read from a row and to deliver an output signal if the tested circuit is in the active state; and control means to precess the number stored in a row and alternatively to cause the number read from a row to be re-recorded therein, in response, respectively, to the presence or absence of an output signal.

3. Apparatus for allocating a time-position of a time-division multiplex transmission system to a calling line which includes a storage unit for each time-position of the multiplex; reading and recording means for repeatedly reading information from and recording information in the storage units one at a time in turn; testing means operable on the reading of information from a storage unit to test a line identified by the information in order to ascertain whether the line is in the calling condition and to deliver a distinctive signal when the tested line is in the calling condition; and control equipment to cause the subsequent recording in the storage unit of information identifying a line other than the line tested and alternatively to re-record in the storage unit the information read therefrom in response, respectively, to the presence or absence of such a signal.

4. Electrical operational control equipment, as claimed in claim 1, in which the condition of a user channel is dependent on the state of an intelligence circuit temporarily associated therewith, and further comprising means for selecting an intelligence circuit for such association determined by a number stored in the matrix row corresponding to the user channel.

5. Electrical operational control equipment, as claimed in claim 4, further comprising means for associating each user channel with each intelligence circuit under control of the precession of the numbers stored in each matrix row 6. Electrical control equipment for allotting one of a plurality of transmission channels to a calling line comprising a plurality of lines, a matrix of bi-stable storage cells having row conductors and column conductors, each row conductor representing a transmission channel, row scanning means for repetitively applying a read pulse followed by a half-write pulse to said row conductors in succession, normally disabled individual column circuits respectively connected to said column conductors and adapted when enabled to produce half-write pulses in synchronism with the half-write pulses applied to said row conductors by said row scanning means, whereby a number representing a line may be recorded in each row, individual registers also respectively connected to said column conductors for temporarily registering the number read from said cells by said read pulses, access means responsive to the condition of combinations of said registers for producing a potential for a selected line, individual coincident test gating means for testing the calling condition of each line, each of said gating means being responsive to the simultaneous presence of a calling condition on said line and a potential from said access means for producing a control pulse, individual control gating means for each of said column circuits, certain of said control gating means being responsive to the condition of the associated register and to the simultaneous production of said control pulse for enabling the column circuit associated therewith, whereby the cell in said column and in the row being scanned will register the condition of the line, the remainder of said control gating means being responsive to the condition of different combinations of said registers for enabling the column circuits associated therewith, the combinations being so chosen that the same number will be re-recorded in a row of said matrix if the line corresponding to said number is in calling condition but a different number will be recorded if the line is not in calling condition.

7. Electrical control equipment, as defined in claim 6, in which the combinations of the registers causing response in the remainder of the control gating means are so arranged that consecutive line numbers will be recorded in the matrix rows at each cycle of operation unless the lines represented by said numbers are in calling condition.

References Cited in the file of this patent

UNITED STATES PATENTS

| | | |
|---|---|---|
| 2,548,661 | Feldman | Apr. 10, 1951 |
| 2,844,812 | Auerbach | July 22, 1958 |
| 2,876,284 | Harris | Mar. 3, 1959 |
| 2,882,517 | Warren | Apr. 14, 1959 |
| 2,955,165 | Budlong et al. | Oct. 4, 1960 |
| 2,961,492 | Carbrey | Nov. 22, 1960 |